United States Patent [19]

Reid

[11] 4,434,348

[45] Feb. 28, 1984

[54] CATHODIC CLEANING OF ALUMINUM TUBE

[75] Inventor: Gary L. Reid, Fletcher, Ohio

[73] Assignee: Hobart Brothers Company, Troy, Ohio

[21] Appl. No.: 339,927

[22] Filed: Jan. 18, 1982

[51] Int. Cl.$^3$ ............................................. B23K 9/235
[52] U.S. Cl. .................... 219/61; 219/60 A; 219/75
[58] Field of Search .................... 219/75, 60 A, 78.14, 219/137 R, 136, 74, 61

[56] References Cited

U.S. PATENT DOCUMENTS

| | | | |
|---|---|---|---|
| 2,906,857 | 9/1959 | Nestor | 219/74 X |
| 3,278,720 | 10/1966 | Dixon | 219/78.14 X |
| 3,280,294 | 10/1966 | Polizzano | . |
| 3,880,340 | 4/1975 | Takeuchi | 219/60 A X |
| 4,168,406 | 9/1979 | Torrani | 219/60 A |

OTHER PUBLICATIONS

"Cathodic Cleaning and Plasma Arc Welding of Aluminum", H. E. Pattee, R. P. Meister, R. E. Monroe, Welding Research Supplement, May 1968, pp. 226–233.

Primary Examiner—B. A. Reynolds
Assistant Examiner—Alfred S. Keve
Attorney, Agent, or Firm—Biebel, French & Nauman

[57] ABSTRACT

A tungsten electrode (35) is positioned adjacent the root face (15) of a tube (10) with the tube and the electrode being connected to a source of direct current (40) such that the electrode is positive with respect to the tube. The electrode is mounted in an assembly (30), and the assembly is provided with a shielding gas from a source (48). The electrode assembly is mounted for rotation on an orbiting head (60) with the electrode axially spaced from the root face. As the electrode is rotated about the tube, the root face (15) and a portion (20) of the inner surface and a portion (25) of the outer surface are simultaneously cathodically cleaned. Preferably, the electrode (35) cleans the root face from two to four times in preparation for a subsequent welding operation.

6 Claims, 6 Drawing Figures

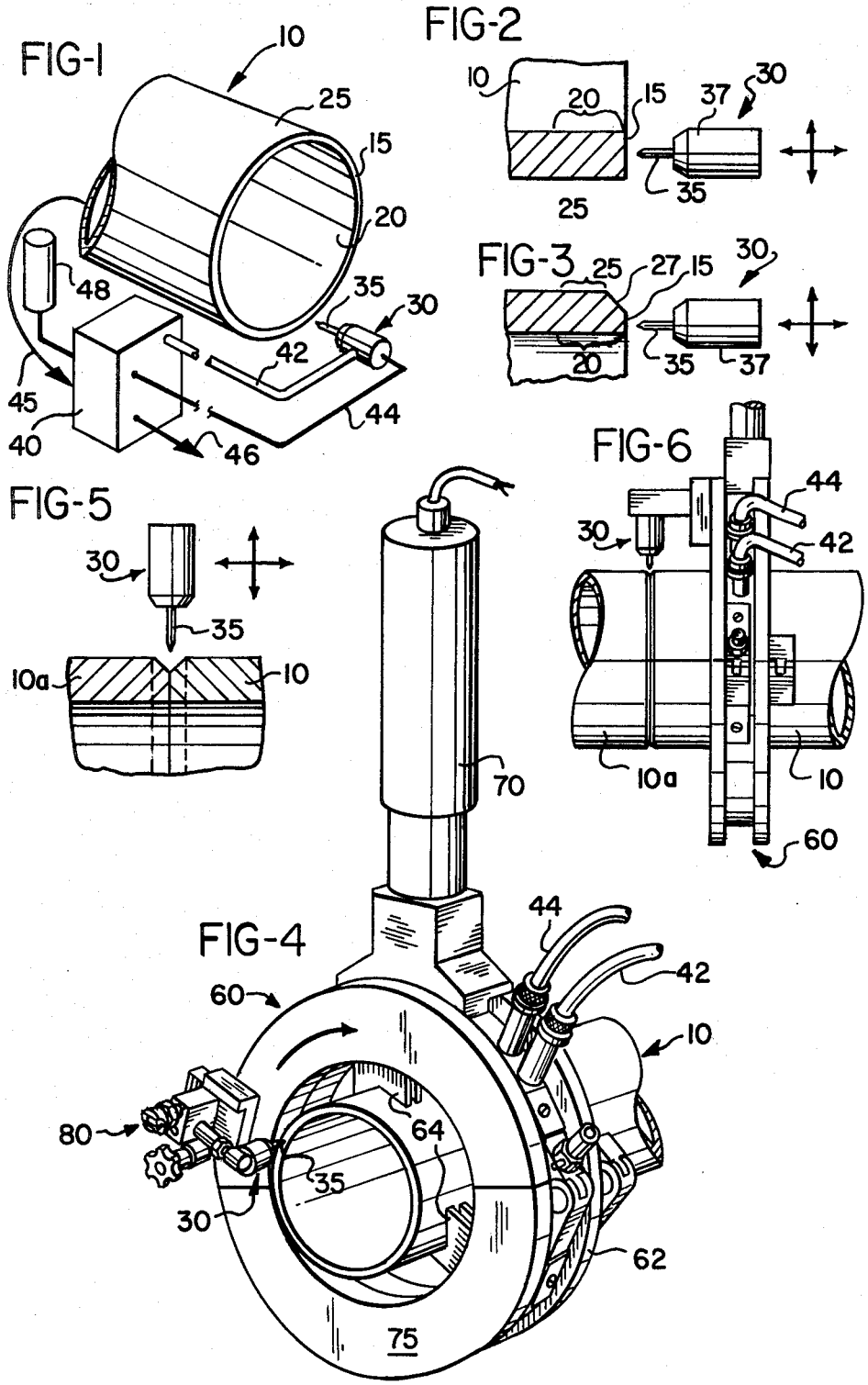

CATHODIC CLEANING OF ALUMINUM TUBE

BACKGROUND OF THE INVENTION

This invention relates to a method and apparatus for cleaning the ends of pipes or tubes in preparation for welding. Before aluminum and certain other metals can be welded, the surface to be welded must be properly prepared and cleaned. Cleaning may be accomplished either mechanically, chemically or electrically. Of these three processes, electrical cleaning is preferred in many instances because it is a simple, inexpensive and highly effective process. In addition, it appears that an electrically cleaned surface will remain in a condition for welding for a much longer period of time than a chemically cleaned or etched surface.

Electrically cleaning a surface usually involves the use of a non-consumable electrode, such as a tungsten electrode, wherein the electrode is made positive relative to the workpiece. In some cases, a separate cleaning electrode is used prior to the welding operation. In other cases, particularly where the surface to be welded is substantially clean, alternating current may be applied to a welding electrode, and the surface cleaned sufficiently during the reverse polarity portion of the alternating current cycle during the welding process. In either case, an inert gas is provided to protect the heated surface from further oxidation during the cleaning and/or welding process.

When joining aluminum pipes, it is essential that not only the root face but both the inner and outer surfaces of the pipe be adequately cleaned prior to welding, and this has been traditionally accomplished by cleaning the ends of the pipe chemically. However, as pointed out above, a chemically cleaned surface will usually not remain clean indefinitely, and where there are many pipes to be welded, it is not always possible to perform the welding operation soon enough after cleaning and therefore the resultant weld frequently reveals embedded defects.

Thus, there is a need to provide a method and apparatus for effectively cleaning the ends of aluminum tubing or pipes prior to welding, preferably electrically cleaned pipes so that defect-free joints will result even though a substantial amount of time has elapsed between the cleaning and the welding operations.

SUMMARY OF THE INVENTION

This invention relates to an apparatus and process for electrically cleaning the edge of a tube or pipe prior to welding. A non-consumable electrode is mounted in an assembly which includes means for providing shielding gas during the cleaning process, and mounted adjacent to the root face of the tube. An electrical power supply is connected to the electrode and the tube whereby the electrode is made positive relative to the tube, therefore causing the tube to be cathodically cleaned as the electrode is moved relative to the end of the tube. Practically speaking, two or three passes of the electrode are usually required in order to ensure proper cleaning.

In some cases, it may be desirable to adjust the current level so that the tube is not excessively heated to cause distortion or melting of the root face surface. In other cases, it may be desirable to adjust the current sufficiently high enough so that a portion of the root face is melted.

Preferably, the electrode is mounted on a conventional orbiting head, and the electrode is positioned with its axis parallel to the axis of the tube with the tip of the electrode centered on the root face of the tube.

This unique physical arrangement of the cleaning electrode will cause not only the root face of the tube to be cathodically cleaned, but will also cause the simultaneous cleaning of both the inner and outer surfaces of the tube adjacent the edge. The cleaning of all of these surfaces prior to welding is essential to obtaining a defect-free weld.

It is therefore an object of this invention to provide a process for cleaning the edge of a tube prior to welding comprising the steps of positioning an electrode adjacent the root face of the tube and causing relative movement between the tube and the electrode while applying direct current between the electrode and the tube such that the electrode is positive with respect to the tube to cause the entire root face of the tube along with a portion of both the inner and outer surfaces of the tube adjacent the edge to be cathodically cleaned.

It is another object of this invention to provide an apparatus for cleaning the edge of a tube prior to welding including means for positioning an electrode adjacent the root face of the tube, means for moving the electrode with respect to the root face of the tube, means for directing shielding gas around the electrode and toward the tube, and means for applying direct current between the electrode and the tube such that the electrode is positive with respect to the tube whereby the entire root face of the tube along with a portion of both the inner and outer surfaces of the tube adjacent the edge are cathodically cleaned.

Other objects and advantages of the invention will be apparent from the following description, the accompanying drawings and the appended claims.

BRIEF DESCRIPTION OF THE DRAWINGS

FIG. 1 is a schematic, pictorial view showing an electrode assembly positioned adjacent the end of a pipe to be cleaned;

FIG. 2 is a plan view showing a portion of the tube in cross section and the position of the cleaning electrode with respect to the root face of the tube;

FIG. 3 is a view showing a section of the pipe in cross section, which pipe has a beveled surface included thereon, and the position of the cleaning electrode with respect to its root face;

FIG. 4 is a pictorial view showing a cleaning electrode assembly mounted on an orbiting mechanism for moving the electrode with respect to the root face of the tube;

FIG. 5 is an elevational view showing two sections of pipe, in cross section, which are joined for welding, and the position of the welding electrode with respect thereto; and FIG. 6 is an elevational view showing a welding electrode mounted for rotation about the pipe by a orbiting mechanism similar to that shown in FIG. 4.

DESCRIPTION OF THE PREFERRED EMBODIMENT

Reference is now made to FIGS. 1-4 which show a preferred embodiment of the invention. Prior to joining two tubes, their end surfaces are generally cut or machined so that the ends are square with respect to the axis of the tube. The squared-off end of the tube, herein referred to as the root face, in some cases may be provided with a bevel to facilitate welding by providing a recess which will accommodate filler metal.

A suitably prepared tube 10 is shown in FIG. 1 as having a root face 15. The root face, along with a portion 20 of the inner surface and a portion 25 of the outer surface of the tube must be first cleaned before it can be welded. This is particularly true of aluminum, and some other materials which are susceptible to oxidation. In the preferred embodiment of the invention, a cleaning electrode assembly, shown generally at 30, includes a cleaning electrode 35 positioned adjacent the root face of the tube. The axis of the electrode is preferably made generally parallel with the axis of the tube.

As shown in FIG. 1, the electrode assembly 30 is connected to a power source 40 by means of a shielding gas supply line 42, electrical cable 44, and grounding cable 45. The unit 40 also provides an output 46 to control the speed of a motor which will move the head relative to the root face. The unit 40 is in turn provided with a source of electrical power (not shown) and a source of shielding gas from tank 48. The shielding gas is preferably argon.

In FIG. 2, the electrode assembly 30 is shown positioned with the electrode 35 centered on the root face 15 of the tube 10. The electrode assembly 30 is provided with a shroud 37, and the shielding gas introduced into the electrode assembly is directed by this shroud so that it surrounds the arc formed between the electrode and the work piece. By applying reverse polarity current to the electrode, that is wherein the electrode is made positive with respect to the work piece [otherwise known as Direct Current Electrode Positive (DCEP)], cathodic cleaning of the work piece will result. Not only will the root face 15 be cleaned, but simultaneously, the portion 20 of the inner surface and the portion 25 of the outer surface adjacent the root face or edge of the tube will be cathodically cleaned thus preparing the tube for subsequent welding. FIG. 3 is similar to FIG. 2 except a beveled surface 27 was machined on the edge of the tube to accommodate filler wire.

Means are provided for moving the electrode with respect to the root face of the tube, and a preferred means shown in FIG. 4 includes an orbiting welding head assembly 60. This is a conventional and commercially available device which includes a hinged-clamping member 62 provided with three radially adjustable "V" jaws 64 for engaging the outer surface of the pipe 10.

A motor 70 cooperates with an internal gearing mechanism (not shown) to rotate a front ring assembly 75 on which the electrode positioning mechanism 80 is mounted. This mechanism permits the electrode 35 to be precisely positioned both radially and axially with respect to the root face. The head assembly 60 is also provided with means for supplying the shielding gas from tube 44 into the electrode assembly along with the electric current necessary to provide the cleaning arc. The front ring assembly 75 is formed from an electrically insulating material.

Once the ends of the tubes to be welded have been properly cleaned, the tubes may be joined, as shown in FIGS. 5 and 6, held in place, and the seam or joint welded by repositioning the electrode assembly as shown in FIG. 6 so that the electrode is directly over the joint. Thus, the same orbiting welding head may be used for both the cleaning and the welding operations, although this is not essential to the invention.

In one embodiment of the invention, the amount of current supplied to the electrode 35 may be adjusted so that while cleaning will occur, the amount of heating of the work piece surface which results is insufficient to cause any melting thereof. In another embodiment, the amount of current supplied to the electrode may be adjusted so that some melting of the surface occurs. The particular process used will depend upon the diameter and the thickness of the pipe, its composition, and the tolerances to which the pipe was initially machined prior to cleaning.

As an example, a 3003 aluminum tube having a 1.315 inch outside diameter and a 0.065 inch wall thickness was cleaned by using 15 amperes and 67 volt direct current electrode positive, using a ballast resistor suitable in size to handle the current and a shielding gas comprising 100% argon supplied to the electrode assembly at 20 cubic feet per hour. In this example, a ballast resistor was used to get the amperage down and the voltage up to provide a more suitable arc characteristic. On thicker material, no ballast resistor is needed. The entire root face of the tube was cleaned by rotating the assembly four times around the root face, with the electrode being moved across the entire root face of the tube once in 13.5 seconds.

Typically, at least two, and sometimes three or four passes will be required to clean the tube sufficient to provide X-ray free or defect-free welds. A zirconium-tungsten electrode is preferably used for both cleaning and welding. For welding, it is preferable for using a shielding gas comprising an argon-helium mixture, and the current supply through the electrode is generally a square wave, alternating current having 60 ampere straight polarity and 20 additional ampere reverse polarity current, the straight polarity being on for 0.20 seconds and the reverse polarity being on for 0.05 seconds.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A process for cleaning the edge of a tube prior to welding comprising the steps of positioning an electrode adjacent the root face of the tube and substantially parallel to the longitudinal axis of the tube and causing relative movement between the tube and the electrode while applying direct current between the electrode and the tube such that the electrode is positive with respect to the tube to cause the entire root face of the tube along with a portion of both the inner and outer surfaces of the tube adjacent the edge to be cathodically cleaned in a single operation.

2. The process of claim 1 wherein the tube and the electrode are moved relative to each other so that the root face passes the electrode at least twice.

3. The process of claim 1 wherein the magnitude of the electrical current applied to the electrode is high enough to melt a portion of the root face of the tube to form a bead thereon.

4. The process of claim 1 wherein said electrode is positioned with its axis parallel to the axis of said tube and wherein the tip of the electrode is centered on the root face.

5. Apparatus for cleaning the edge of a tube prior to welding including an electrode adjacent the root face of the tube with the electrode substantially parallel to the longitudinal axis of the tube, means for moving the electrode with respect to the root face of the tube, means for directing shielding gas around the electrode and toward the tube, and means for applying direct current between the electrode and the tube such that the electrode is positive with respect to the tube whereby the entire root face of the tube along with a portion of both the inner and outer surfaces of the tube adjacent the edge are cathodically cleaned in a single operation.

6. The apparatus of claim 5 wherein said electrode moving means includes an orbiting head assembly mounted on the tube and wherein said electrode is adjustably mounted on said electrode moving means.

* * * * *